UNITED STATES PATENT OFFICE.

JOHN RALSTON, OF GREENVILLE, PENNSYLVANIA.

IMPROVEMENT IN COMPOSITION PASTE FOR FLY-PAPER.

Specification forming part of Letters Patent No. 181,476, dated August 22, 1876; application filed May 9, 1876.

*To all whom it may concern:*

Be it known that I, JOHN RALSTON, of Greenville, Mercer county, in the State of Pennsylvania, have invented a new and Improved Sticky Fly-Paper Paste, of which the following is a specification:

The object of this invention is to furnish an improved sticky fly-paper paste, put up in boxes, so that it can be spread upon paper by the user, and will always be fresh, and at the same time much less expensive than when bought already spread upon paper.

The invention consists in a sticky fly-paper paste, formed of the ingredients, in the proportions, hereinafter described.

In preparing my improved paste I mix together two ounces of flaxseed-oil, (but various other oils may be used,) two ounces of Venice turpentine, and eight ounces of rosin.

The paste thus prepared is put up in tin or iron boxes, and sold in the form of paste.

In using the paste, the buyer spreads it upon paper, and uses the sticky paper in the same way as ordinary fly-paper is used.

The advantages of this invention are, the paste will always be fresh, and will be much less expensive than when bought spread upon paper.

Having thus described my invention, what I claim as new, and desire to secure by Letters Patent, is—

A sticky fly-paper paste, consisting of oil, Venice turpentine, and rosin, substantially in the proportions herein described.

JOHN RALSTON.

Witnesses:
   J. L. CALDWELL,
   W. C. E. MARTIN.